April 3, 1928.

H. R. HUGHES, JR

SHOCK ABSORBER

Filed Jan. 9, 1924

1,664,510

Howard R. Hughes Jr. Inventor

By Jesse R. Stone

Attorney

Patented Apr. 3, 1928.

1,664,510

UNITED STATES PATENT OFFICE.

HOWARD R. HUGHES, JR., OF HOUSTON, TEXAS.

SHOCK ABSORBER.

Application filed January 9, 1924. Serial No. 685,103.

My invention relates to shock absorbers for use on motor vehicles. It is particularly applied to shock absorbers of the pneumatic type wherein a cushion of air under pressure is used to sustain the weight of the vehicle body.

An object of the invention is to provide a pneumatic shock absorber having a large working volume of the pressure fluid above the piston.

Another object is to provide means for automatically regulating the pneumatic pressure above the piston when varying loads are sustained thereon.

Figure 2:
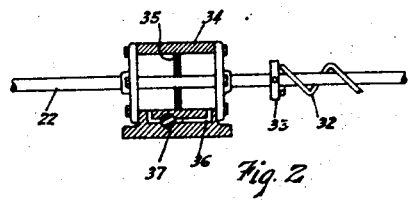
Figure 1:
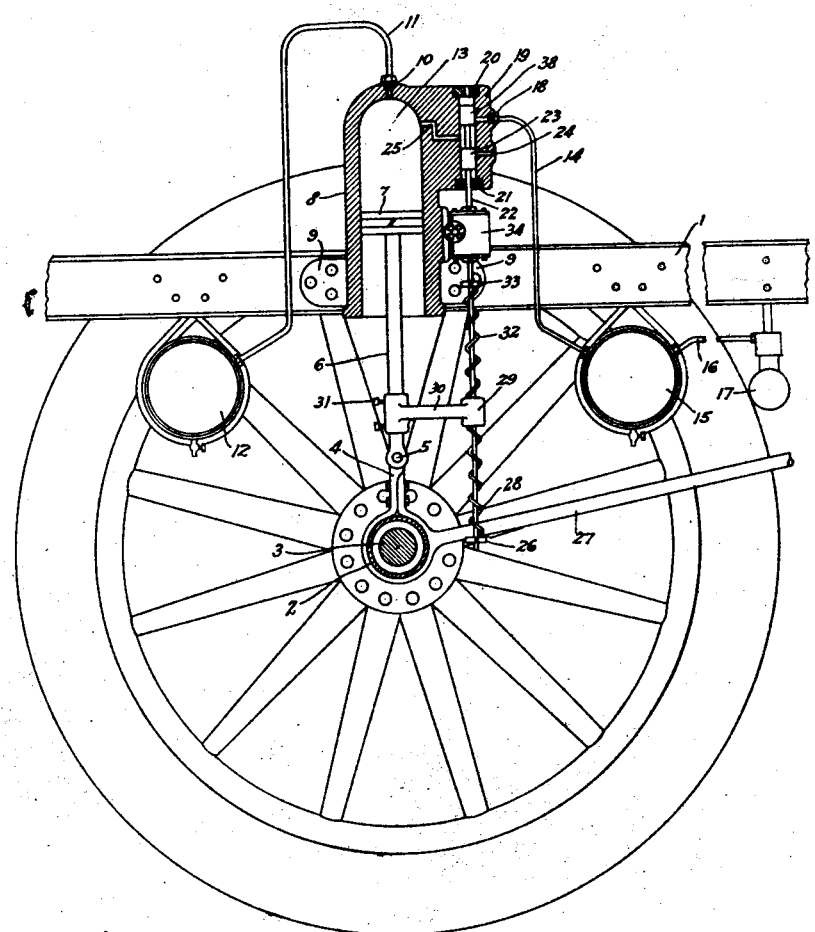

Other objects and advantages of the construction will become apparent from the more detailed description which follows. Referring to the drawing herewith wherein a preferred embodiment of the invention is disclosed, Fig. 1 is a central vertical section through the cylinder and housings of my invention shown as applied to the frame of a vehicle. Fig. 2 is a broken detail in central section through the dash pot employed with the pressure regulating mechanism. Like numerals of reference are employed to designate like parts in both the views.

In the drawing I have shown my device somewhat diagrammatically as supported upon the vehicle frame or chassis 1, said frame being supported upon a housing 2 surrounding the axle 3. The vertical supporting connection between the axle housing and the frame work is made entirely by my pneumatic shock absorbing device. A bracket 4, clamped about the housing is extended upwardly for connection at 5 with a piston rod 6 having on its upper end a piston 7, working within a cylinder 8.

The said cylinder is secured to the inner side of the frame 1 by means of brackets 9, in position vertically above the supporting bracket 4 of the piston rod. The cylinder is open at its lower end and closed at its upper end, except for an opening 10 connected by means of a pipe 11 with a storage tank 12. This connection of the cylinder with the storage tank has the effect of enlarging the volume of the cylinder above the piston.

The chamber 13 above the piston may be connected through a pipe 14 with a pressure tank 15, which in turn is connected through a pipe 16 with a pump 17. It is contemplated that the pressure within the tank 15 may be maintained at a predetermined amount by automatically regulated means upon the pump 17. This arrangement is common in the art and is not specifically illustrated.

The connection between the cylinder chamber 13 and the pipe 14 is by way of a valve chamber 18 formed in the thickened walls of the housing 19. This chamber has at the upper end a perforated plug 20 and at its lower end a similar plug 21 through which works a valve stem 22. Said valve stem has within the valve chamber 18 two piston valves 23 spaced apart a predetermined distance so that normally the upper piston closes the connection between the chamber and the pipe 14. The lower piston valve closes an outlet passage 24 which forms a discharge port for air under pressure when the pressure is to be relieved. A passage 25 connects the upper end of the chamber 13 to the valve chamber 18.

The valve stem 22 is extended downwardly to a point adjacent the axle 3 and has thereon a washer or ring 26 secured adjustably thereto. Above the ring 26 is a spiral spring 28 which bears at its upper end against a sleeve 29 secured on the forward end of an arm 30 which is rigidly secured to the piston rod 6 by means of set screws 31. Above the sleeve 29 is a similar spring 32 which bears against said sleeve at its lower end and against a ring or washer 33 at its upper end, said ring being secured adjustably to said rod. The valve stem is slidable through the sleeve 29 and through a cylindrical chamber 34. Within this chamber there is secured to the valve stem a perforated disc or plate 35 which forms a piston within the cylinder 34 to form a dash pot. The walls of the dash pot are thickened at one side and formed with a by-pass 36 connecting the opposite ends of the cylinder. In said passage 36 is a hand operated valve 37 by means of which the passage of liquid through the by-pass may be regulated.

In the operation of this device the pressure above the piston will be so regulated as to support the weight of the vehicle in proper spaced relation above the axle. When additional weight is placed upon the vehicle body, due to passengers getting into the vehicle and otherwise, the tendency will be for the frame 1 to be forced downwardly toward the axle, forcing the piston 7 upwardly into the cylinder of the shock absorber to a point somewhat above its original position. This motion will be transmitted also to the valve rod 22, thus forcing the upper piston 38 of the valve above the opening to the pipe 14 and allowing air under pressure to enter through the valve chamber and the passage 25 to the chamber 13 above the piston. This inlet of air under pressure will continue until the piston 7 is forced downwardly relative to the frame, carrying with it the valve stem 22 and finally closing the inlet from the pipe 14 and shutting off the entrance of further air from the pressure tank. This action will be entirely automatic and as the load thus placed upon the frame is a continuous one the dash pot at 34 will not materially affect the prompt reaction of the mechanism to the additional load.

This same action in reverse order will take place when the load is removed from the frame of the vehicle. In that case, the pressure above the piston 7 will tend to raise the frame and cylinder relative thereto, thus lowering the piston valves in the chamber 18. This will open the outlet port 24. The plug 21 will prevent movement downwardly of valve 23 sufficiently to expose pipe 14 to exhaust above valve piston 38. Exhaust of air will continue until the pressure above the piston 7 is regulated in such manner that the exhaust ports are again closed.

In the ordinary conditions of traffic along a roadway there will be shocks delivered through the wheel and axle upwardly toward the frame due to the passage of the wheel over bumps or irregularities in the roadway. Such a shock would be delivered upwardly by the piston 7 against the cushion of air above it, and as this cushion of air has a large volume it would not materially compress this volume and hence there would be slight tendency toward recoil. The wheel would again drop back after passage over the bump to its original position without materially affecting the position of the car body. This sort of action will not affect the valve rod 22 due to the resilient connection of the said rod with the piston rod 6 and also to the dampening effect of the dash pot 34. The springs 28 and 32 will absorb this motion and the dash pot, due to its sluggish action, will overcome any tendency of the valve rod to move quickly. The result will be that the ordinary vibrations of traffic will not be transmitted to the valve pistons 23 and 38 and no action of either will take place.

The advantage of this type of shock absorber lies in the fact that ordinary shock or vibrations due to passage over the roadway will not be transmitted to the frame of the car. The tendency will be for the car frame to be held in the same relative horizontal position. There will be no recoil in a shock absorber of this kind, as is the case where springs are used. Furthermore, the shock absorber will automatically adjust itself for heavy or light loads and the tendency of the shock absorber to work differently under varying loads will be avoided. The further advantages of this construction will be readily understood by one skilled in the art without further descriptions.

What I claim as new and desire to protect by Letters Patent is:

1. In a vehicle including a frame and axle, a cylinder, a piston in said cylinder, a rod on said piston, said cylinder and piston being connected between said frame and axle, a tank for air under pressure, a pipe connecting the tank and said cylinder beyond said piston, a valve in said pipe, a valve stem on said valve having resilient connection with said piston and a dash pot on said stem acting to resist movement of said stem and valve, said valve controlling the air to said cylinder to maintain the normal position of said piston therein.

2. In a vehicle including a frame and axle, a cylinder on said frame closed at its upper end, a piston in said cylinder supported upon said axle, a pressure tank for air under pressure, a pipe from said tank connecting with said cylinder above said piston, an automatically controlled valve in said pipe, and resilient means to dampen the action of said valve.

In testimony whereof, I hereunto affix my signature this 14th day of January, A. D. 1928.

HOWARD R. HUGHES.